US009143287B2

(12) United States Patent
Gunasekara et al.

(10) Patent No.: US 9,143,287 B2
(45) Date of Patent: Sep. 22, 2015

(54) MITIGATION OF WIRELESS SIGNAL INTERFERENCE

(71) Applicant: Time Warner Cable Enterprises LLC, New York, NY (US)

(72) Inventors: Don Gunasekara, Reston, VA (US); Harriet DuBois, Herndon, VA (US); Kevin Caldwell, Vienna, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 54 days.

(21) Appl. No.: 13/914,005

(22) Filed: Jun. 10, 2013

(65) Prior Publication Data

US 2014/0362897 A1 Dec. 11, 2014

(51) Int. Cl.
*H04L 1/00* (2006.01)
*H04B 1/10* (2006.01)
*H04L 1/20* (2006.01)

(52) U.S. Cl.
CPC .................... *H04L 1/206* (2013.01)

(58) Field of Classification Search
CPC ... H04L 43/16; H04B 10/272; H04N 21/6168
USPC ................. 375/346, 220, 141, 344
See application file for complete search history.

(56) References Cited

U.S. PATENT DOCUMENTS 5,991,308 A * 11/1999 Fuhrmann et al. ....... 370/395.53
6,356,555 B1 * 3/2002 Rakib et al. ............... 370/441
2006/0093024 A1 * 5/2006 Pietraski et al. ........... 375/220
2009/0296864 A1 * 12/2009 Lindoff et al. ............ 375/357

OTHER PUBLICATIONS

"M-CMTS Operations Support System Interface Specification", Data-Over-Cable Service Interface Specifications Modular Headend Architecture, 2005-2008 Cable Television Laboratories, Inc, pp. 47.
"EQAM Architectural Overview Technical Report", Data-Over-Cable Service Interface Specifications Modular Headend Architecture, 2008 Cable Television Laboratories, Inc, pp. 39.

* cited by examiner

*Primary Examiner* — Qutbuddin Ghulamali
(74) *Attorney, Agent, or Firm* — Chapin IP Law, LLC

(57) ABSTRACT

A signal analyzer resource monitors a signal in a downstream channel of a shared physical communication link. In response to detecting presence of wireless interference coupling onto the signal received in the downstream channel, the signal analyzer resource communicates a feedback message to a management resource (or other suitable resource) over an upstream channel of the shared physical communication link. The message indicates the presence of the wireless interference. According to a more specific configuration, the signal analyzer resource can be configured to: detect a type of modulation used to modulate data on a signal received in a channel over a shared cable network; map the detected type of modulation to a corresponding set of configuration values; and utilize the corresponding set of configuration values as a basis to monitor and/or detect a presence of wireless interference on the channel. The signal analyzer resource can mitigate affects of interference.

35 Claims, 9 Drawing Sheets

MITIGATION OF WIRELESS SIGNAL INTERFERENCE

BACKGROUND

Conventional cable networks have long been used to distribute content over physical communication media such as coaxial cables, fiber optic links, etc., to multiple subscribers in a cable network environment. Typical distribution of content includes modulating a signal in accordance with QAM (Quadrature Amplitude Modulation) encoding and then transmitting the modulated QAM signals to multiple subscribers over the physical communication medium. Signals are typically transmitted over the physical communication media are encoded in multiple different channels using multiple RF (Radio Frequency) oscillation rates.

There is currently is no interference mitigation technique built into set-top boxes or subscriber domains (where the set-top boxes reside) to compensate for interference caused by wireless network signals such as those associated with LTE (Long Terminate Evolution) networks. In general, LTE is a wireless network that operates in the same frequency bands as many cable operators. For example, the majority of LTE deployments in the United States are currently taking place in two frequency bands such as band 13 (DL 746-756 MHz, UL 777-787 MHz) for Verizon™ and Band 17 (DL 734-746 MHz, UL 704-716 MHz) for AT&T™, both of which are within operating frequencies used by the cable operators.

Propagation and attenuation characteristics of wireless 700 MHz signals are very different from wireless signals at higher frequencies. For example, these relatively lower frequency signals travel further and are less attenuated by structures, distance, etc., than are higher frequency wireless signals. Thus, presence of such signals in an environment can have a greater interference impact.

Additionally, user operated wireless mobile devices that transmit around this frequency range (e.g., 700-800 MHz) may be located in close proximity to a respective set-top box in a subscriber domain (where the set-top box resides), increasing a likelihood of possible interference with signals transmitted in a coaxial cable. Circuitry in the set-top box that processes the signals may be susceptible to wireless interference as well.

In certain instances, an output from a LTE base station can substantially interfere with signals in a physical cable or set-top box. It is further noted that LTE technology uses so-called Orthogonal Frequency-Division Multiplexing (OFDM) in a respective downlink. This means LTE signals also have a higher peak-to-average ratio (crest factor) than other cellular technologies. Generally speaking, a signal with a higher crest factor will lead to more ingress interference (on radio frequency cable signals) as the wireless signal energy is concentrated in a smaller portion of the allocated bandwidth.

Note that LTE is only one source of possible wireless interference that can affect communications. Other sources of interference can include wireless transmissions in accordance with wireless communication standards (such as GSM—Global System for Mobile Communications, AWS_Advanced Wireless Services, UMTS—Universal Mobile Telecommunications System, etc.) used to transmit data in a wireless environment.

BRIEF DESCRIPTION OF EMBODIMENTS

Conventional networks suffer from deficiencies. For example, cable networks are prone to reliability issues such as insufficient shielding of core signal carrying conductors, insufficient shielding of circuitry that processes RF signals received over a cable, shielding failures, loose connectors, damaged cables, etc. Any of these system imperfections can enable wireless signals (such as wireless LTE signals) transmitted over the air to couple onto a respective physical medium and/or interfere with a respective legitimate data signal being received by a target recipient.

For example, as mentioned, wireless signals may be transmitted at a same or similar RF frequency band as an RF frequency used to transmit and receive data over a physical communication link in a cable network environment. If the coupling of the wireless transmitted signal onto the physical medium (or signal processing circuitry) is sufficiently strong, a subscriber will not be able to demodulate, decode, and playback the legitimate cable network signal. In other words, the integrity of the original data signal transmitted in a physical communication link may be compromised in the event that the original wireless signal coupled onto the physical communication link is strong enough.

Certain embodiments herein are directed to reducing an affect of wireless interference on signals received in a cable network environment. For example, one embodiment herein includes signal processing hardware. The processing hardware can be configured to detect a type of modulation used by a transmitter resource to modulate data on a signal received in a channel over a shared cable network. In one embodiment, the processing hardware maps the detected type of modulation to a corresponding set of configuration values (such as one or more threshold values). A portion of configuration values can be used set configure a correlator resource that processes the received signal.

In accordance with further embodiments, the processing hardware utilizes the corresponding set of configuration values as a basis to monitor and detect a presence of wireless interference on the channel. For example, the configuration values can specify threshold values for corresponding performance parameters monitored by the processing hardware. Based on analysis of the received signal, the processing hardware generates performance metrics for each of the performance parameters. The processing hardware compares the performance metrics to one or more of the configuration values (such as threshold values) to determine whether the received signal has been corrupted by exposure to wireless interference. Appropriate measures as further described herein can be taken if a sufficient level of wireless interference is detected in a received signal.

In accordance with another embodiment, signal-processing hardware (such as a signal analyzer resource in a set-top box, cable modem, etc.) is configured to monitor a signal received on a downstream channel of a shared physical communication link. In response to detecting presence of wireless interference on a received signal, the signal-processing hardware communicates a feedback message to a management resource over an upstream channel of the shared physical communication link. In one embodiment, the feedback message indicates the presence of wireless interference detected on a signal received in the downstream channel. Transmission of the feedback message to the management resource enables the management resource to mitigate the affects of the wireless interference.

In accordance with yet another embodiment, a management resource (such as a content distribution manager in a cable network environment) is configured to control a transmitter resource to transmit a signal on a primary channel downstream over a shared physical communication link to multiple target resources in a cable network environment. The multiple targets resources selectively tune to the primary channel to retrieve and playback respective content. The management resource receives notification from a given target resource of the multiple target resources that the signal received by the given target resource on the primary channel has been corrupted. One source of possible corruption is wireless interference caused by LTE system or other wireless system operating in the same frequency spectrum as the primary channel. In one embodiment, in response to detecting corruption of the signal received on the primary channel, the content distribution manager allocates a secondary channel on which to transmit the signal downstream to the given target resource. Accordingly, even though wireless interference occurs and corrupts the signal on the primary channel, the target resource such as a subscriber can receive a rendition of the signal on an auxiliary channel.

In general, any suitable frequency band of the physical communication link can be monitored for presence of wireless interference. By way of a non-limiting example, the monitored frequency band can include at least a portion of data transmitted on carrier radio frequencies between 700 and 800 MHz. At least a portion of this radio frequency band can be allocated to support wireless communications such as LTE communications in the network environment.

Note that any of the resources as discussed herein can include one or more computerized devices, processing hardware, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs and corresponding processing hardware to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having computer processor hardware, program and/or cause the computer processor hardware to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or short code in one or more ROM, RAM, PROM, etc., or as an Application Specific Integrated Circuit (ASIC), etc. The software or firmware or other such configurations can be installed onto a computerized device (or computer processor hardware) to cause the computerized device (or computer processor hardware) to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by processing hardware, cause the processing hardware of the system to: detect a type of modulation used to modulate data on a signal received in a channel over a shared cable network; map the detected type of modulation to a corresponding set of configuration values; and utilize the corresponding set of configuration values as a basis to monitor and/or detect a presence of wireless interference on the channel.

Yet another embodiment herein includes a method and computer readable storage medium and/or system having instructions stored thereon. The instructions, when executed by processing hardware, cause the processing hardware of the system to: monitor a signal in a downstream channel of a shared physical communication link; detect presence of wireless interference coupling onto the signal received in the downstream channel; and communicate a feedback message to a management resource over an upstream channel of the shared physical communication link, the message indicating the presence of the wireless interference.

Yet another embodiment herein includes a method and computer readable storage medium and/or system having instructions stored thereon. The instructions, when executed by processing hardware, cause the processing hardware of the system to: control a transmitter resource to transmit a signal on a primary channel downstream over a shared physical communication link to multiple target resources; receive notification from a given target resource of the multiple target resources that the signal received by the given target resource on the primary channel is corrupted; and allocate a secondary channel on which to transmit the signal downstream to the given target resource.

The ordering of the operations in each of the above example has been presented for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for detecting occurrence of wireless interference and/or mitigating affects caused by wireless interference. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with general embodiments as discussed herein, a signal analyzer resource monitors a signal in a downstream channel of a shared physical communication link. In response to detecting presence of wireless interference coupling onto the signal received in the downstream channel, the signal analyzer resource communicates a feedback message to a management resource over an upstream channel of the shared physical communication link. The message can indicate the presence of the wireless interference.

In accordance with further embodiments, the signal analyzer resource can be configured to detect a type of modulation used to modulate data on a signal received in a channel over a shared cable network. The signal analyzer resource maps the detected type of modulation to a corresponding set of configuration values (such as threshold values, correlator settings, etc.). The signal analyzer resource utilizes the corresponding set of configuration values as a basis to monitor and/or detect a presence of wireless interference on the channel. For example, the signal analyzer resource can be configured to generate a set of performance metrics associated with the received signal. The signal analyzer resource compares the performance metrics to the threshold values (as specified by the configuration values) to determine the presence of wireless interference above an unacceptable threshold.

Figure 1:
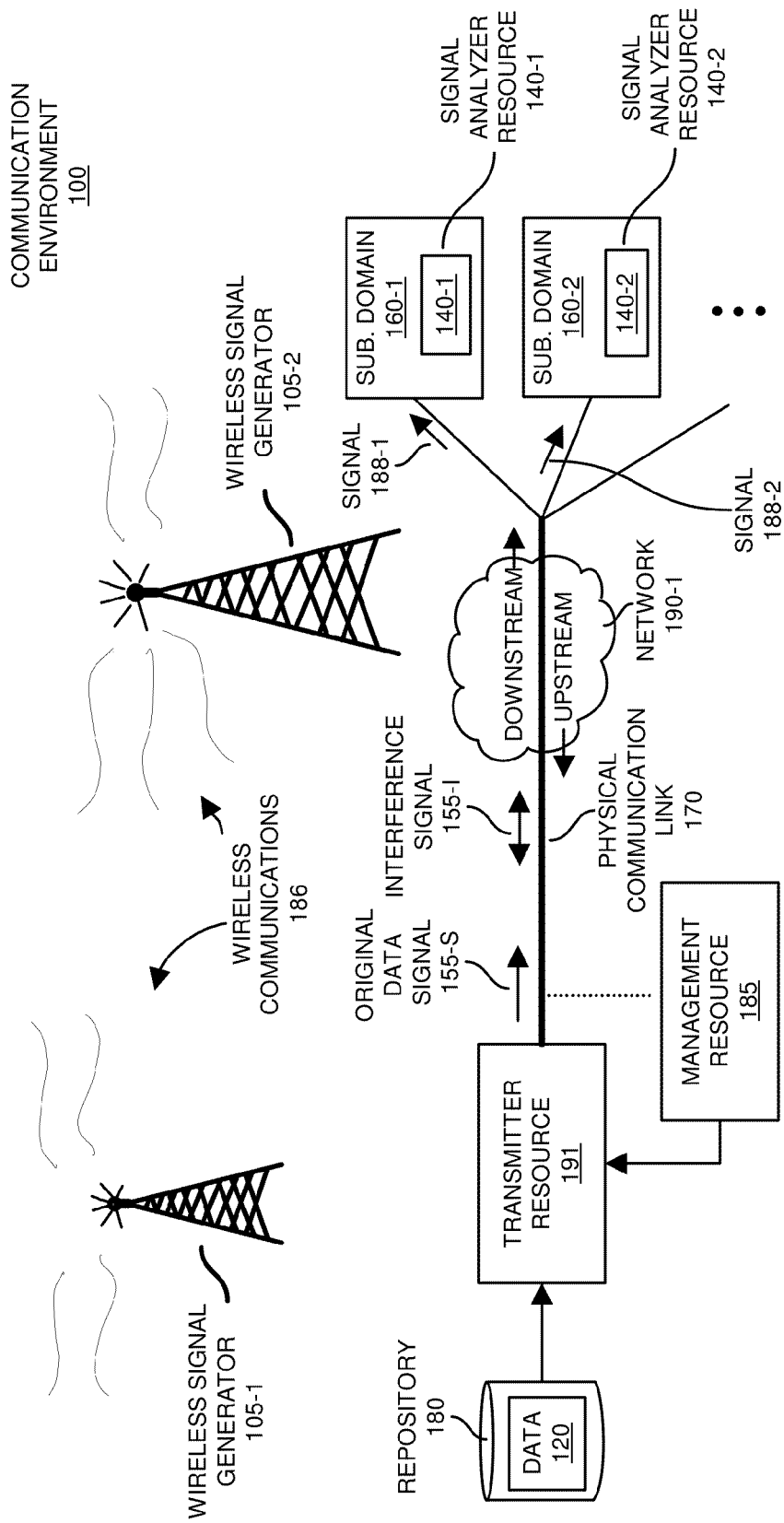
FIG. 1 is an example diagram illustrating a communication environment susceptible to wireless interference according to embodiments herein.

Now, more specifically, FIG. 1 is an example diagram illustrating a communication environment 100 according to embodiments herein.

As shown, communication environment 100 includes transmitter resource 191 and physical communication link 170. Physical communication link 170 can be part of network 190-1 facilitating distribution of content to each of multiple subscriber domains such as subscriber domain 160-1, subscriber domain 160-2, etc. (collectively, subscriber domains 160).

In general, transmitter resource 191 generates and transmits original data signal 155-S over physical communication link 170 to one or more subscriber domains 160. Each of subscriber domains 160 can include appropriate processing hardware and software to process signals received one or more channels of the physical communication link 170. The processing hardware and corresponding software in each subscriber domain can perform tasks such as storage of content referenced over physical communication link 170, playback of content received over physical communication link 170, etc.

In accordance with one embodiment, during operation, the transmitter resource 191 receives data 120 stored in repository 180 from any suitable resource. The transmitter resource 191 can be configured to receive the data 120 as a stream of data in a suitable modulation and data-encoding format.

Transmitter resource 191 (such as a cable modem termination system, content distribution equipment, server, etc.) modulates received data 120 in accordance with any modulation technique for transmission over physical communication link 170. In one non-limiting example embodiment, the transmitter modulates and transmits the received data 120 in accordance with QAM (Quadrature Amplitude Modulation). The data can be encoded in accordance with a suitable encoding format such as MPEG (Moving Pictures Expert Group).

Physical communication link 170 can be any suitable type of physical medium over which data 120 (which is encoded as original data signal 155-S) can be transmitted to downstream entities such as subscriber domains 160. By further way of a non-limiting example, note that the physical communication link 170 can be a coaxial cable, fiber optic link, twisted pair of wires, shield conductors, etc. Physical communication link 170 may be present in network 190-1 such as a HFC (Hybrid Fiber Coaxial) cable network.

As mentioned above, the subscriber domains 160 can include processing equipment such as one or more set-top boxes, cable modems, etc., to process one or more signals received over the physical communication link 170. As discussed herein, the processing hardware such as signal analyzer resource 140-1 in a respective subscriber domain 160-1 is configured to detect presence of wireless interference in a respective monitored channel as well as mitigate and/or correct the signal. In one embodiment, the signal analyzer resource 140-1 monitors signal degradation caused by presence of wireless interference above a threshold value as caused by presence of wireless communications 186 in communication environment 100.

Each subscriber domain can experience different amounts of wireless interference. Signal analyzer resource 140-2 monitors signal degradation caused by presence of wireless interference above a threshold value as caused by presence of wireless communications 186 in communication environment 100 with respect to subscriber domain 160-2.

As in any system, there may be a certain amount of noise and/or interference that couples onto signals transmitted over the physical communication link 170. For example, communication environment 100 can include wireless signal generators 105-1, 105-2, etc., such as base stations that operate in a same frequency band that one or more signals are transmitted over physical communication link 170.

Each of the wireless signal generators 105 can transmit respective wireless communications 186 (i.e., signals) at one or more different radio frequencies through the air to each other or target devices (such as handheld mobile devices) present in the communication environment 100. Generally, wireless signal generators 105 operate independently of transmitter resource 191.

In certain instances, the signal 188-1 (a combination of original signal 155-S plus some amount of wireless interference signal 155-I) is received and processed by signal analyzer resource 140-1. The received signal 188-1 can be degraded (compared to original signal 155-S) as a result of exposure to interference signal 155-I.

In a similar manner as discussed above, the signal 188-2 (a combination of original signal 155-S plus some amount of wireless interference signal 155-I) is received and processed by signal analyzer resource 140-2. The received signal 188-2 can be degraded (compared to original signal 155-S) as a result of exposure to interference signal 155-I. Signal analyzer resource 140-2 operates in a similar manner as signal analyzer resource 140-1.

Signals 188 (such as signal 188-1, signal 188-2, etc.) can include any suitable type of content such as video data, broadcasted content, voice over IP data, Internet data, web page data, audio data, etc. A degraded signal can result in improper image playback, voice quality reduction, interruption of service, etc.

Figure 2:
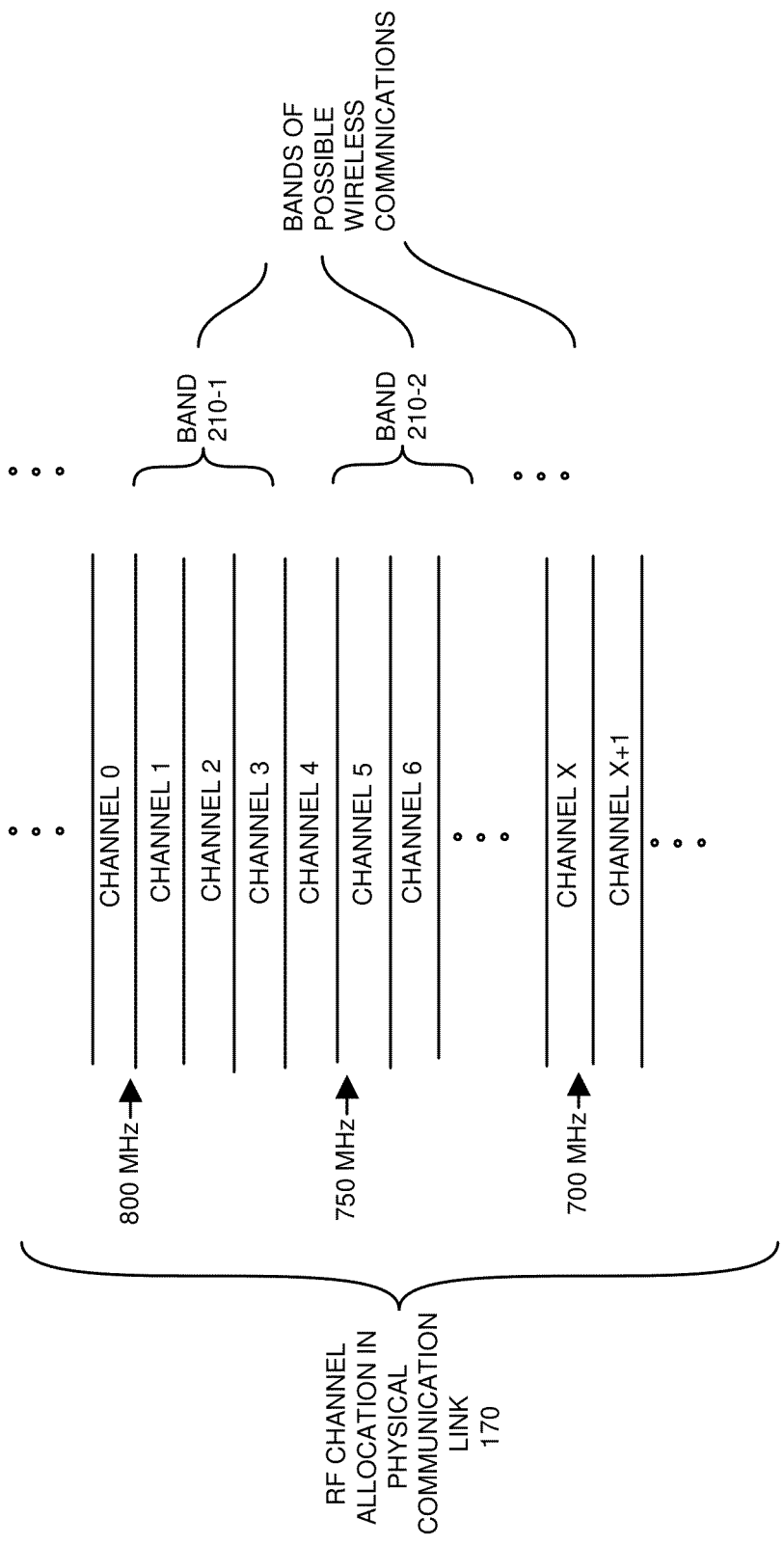
FIG. 2 is an example diagram illustrating allocation of available bandwidth in a physical communication link in comparison to allocation of available bandwidth for wireless communications according to embodiments herein.

FIG. 2 is an example diagram illustrating overlapping use of an RF spectrum in physical communication link versus use of at least a portion of the RF spectrum to support wireless communications according to embodiments herein.

More specifically, as shown, the available frequency bandwidth in the physical communication link 170 can be partitioned to support transmission of multiple channels for transmitting data. For example, between 700 and 800 MHz, the physical communication link 170 can be configured to convey channel #1 through channel #X at different respective carrier frequencies. The transmitter resource 191 transmits corresponding signals in respective blocks of channels over physical communication link 170 to one or more subscriber domains 160.

Each of the subscribers in respective subscriber domains can selectively tune to a channel in a respective block to perform functions such as playback or storage of content. For example, channels 0 through 5 can represent a block of channels. Each block can be assigned a respective carrier frequency on which transmit multiple channels of content. The subscriber domain tunes to a specific channel in a block to retrieve desired content.

As mentioned, at least a portion of the wireless spectrum (e.g., over-air communications) in communication environment 100 can be allocated to support wireless communications 186 at the same RF frequencies used to convey data 120 in physical communication link 170. For example, as previously discussed, wireless signal generators 105 (and/or corresponding mobile devices) can be configured to generate wireless communications 186 over the air (in communication environment 100) in frequency band 210-1, frequency band 210-2, etc.

Signal analyzer resources 140 monitor and detect an occurrence of wireless interference in a respective channel or block of channels.

When the physical communication link 170 is properly shielded, transmission of the wireless communications 186 in communication environment is typically not detrimental because little or no RF energy from the wireless communications 186 in bands 210 couples onto the physical communication link 170 and causes interference to corresponding signals therein. However, the occurrence of a link failure on the physical communication link 170, poor circuit shielding, exposure of high levels of wireless communications 186 to processing circuitry, etc., can cause at least a portion of the RF energy in bands 210 to couple onto the physical communication link 170, degrading signals transmitted over the physical communication link 170.

Referring again to FIG. 1, the physical communication link 170 may be damaged for any number of reasons such as a loose connector, rodent chewing on the physical communication link 170, etc. The one or more damaged locations of the physical communication link 170 are places where the ingress RF energy from wireless communications 186 are more likely to couple onto the physical communication link 170 and cause interference via interference signal 155-I.

As another possible source of signal degradation, signal-processing circuitry (such as in signal analyzer resource) may be susceptible to the wireless interference caused by presence of wireless communications 186.

Note that interference may not be limited to a particular channel or block of channels. For example, wireless communications transmitted in frequency band 210-1 can directly impact channel #1, channel #2, and channel #3. Wireless communications in frequency band 210-1 can affect other adjacent channels such as channel #0, channel #4, channel #5, etc.

Additionally, note that LTE is only one source of possible wireless interference. Other sources of interference can include wireless transmission in accordance with any wireless communications standards (such as GSM—Global System for Mobile Communications, AWS_Advanced Wireless Services, UMTS—Universal Mobile Telecommunications System, etc.) used to transmit data in a wireless environment.

Figure 3:
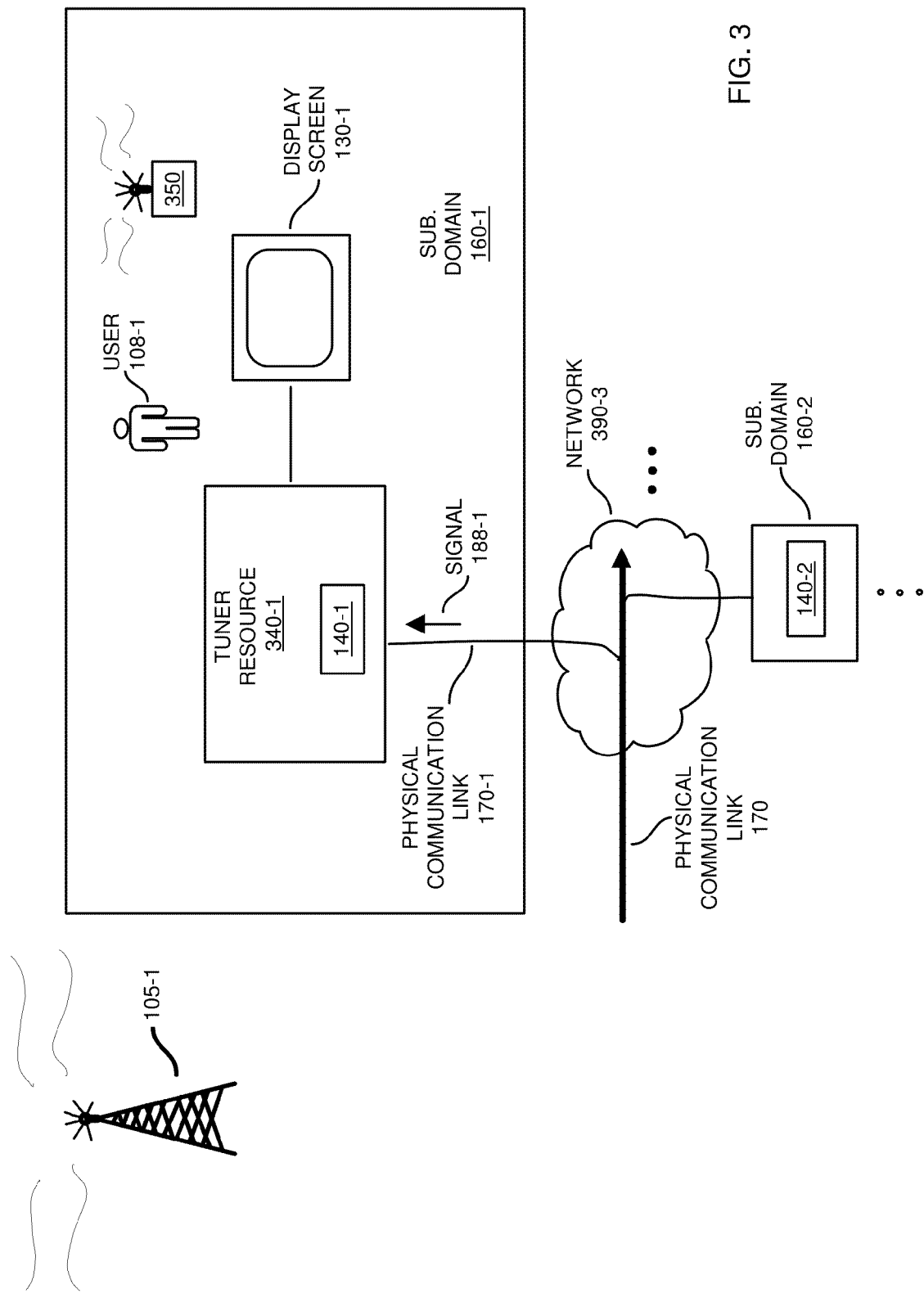
FIG. 3 is an example diagram illustrating implementation of a signal analyzer resource in a respective subscriber domain of a cable network environment according to embodiments herein.

FIG. 3 is an example diagram illustrating a subscriber domain according to embodiments herein.

As shown, subscriber domain 160-1 includes a tuner resource 340-1 such as a set-top box, cable modem, computer device, etc. User 108-1 (such as a subscriber) can provide input to control tuner resource 340-1. As its name suggests, tuner resource 340-1 tunes to a respective channel in a block based on the input provided by user 108-1.

In one embodiment, the tuner resource 340-1 demodulates and decodes a respective channel selected by user 108-1. The tuner resource 340-1 plays back the content received over the selected channel on display screen 130-1.

The tuner resource 340-1 and/or received signal 188-1 in the selected channel may be susceptible to wireless interference for reasons as previously discussed.

In this example embodiment, tuner resource 340-1 includes signal analyzer resource 140-1. As previously discussed, signal analyzer resource 140-1 can be configured to analyze signal 188-1 to detect interference and/or mitigate affects of the wireless interference.

Subscriber domain 160-2 also can include a signal analyzer resource 140-2 to detect interference and/or mitigate affects of the wireless interference. Any device or resource in a respective subscriber domain can include a signal analyzer resource 140 to detect and/or mitigate affects of wireless interference.

Figure 4:
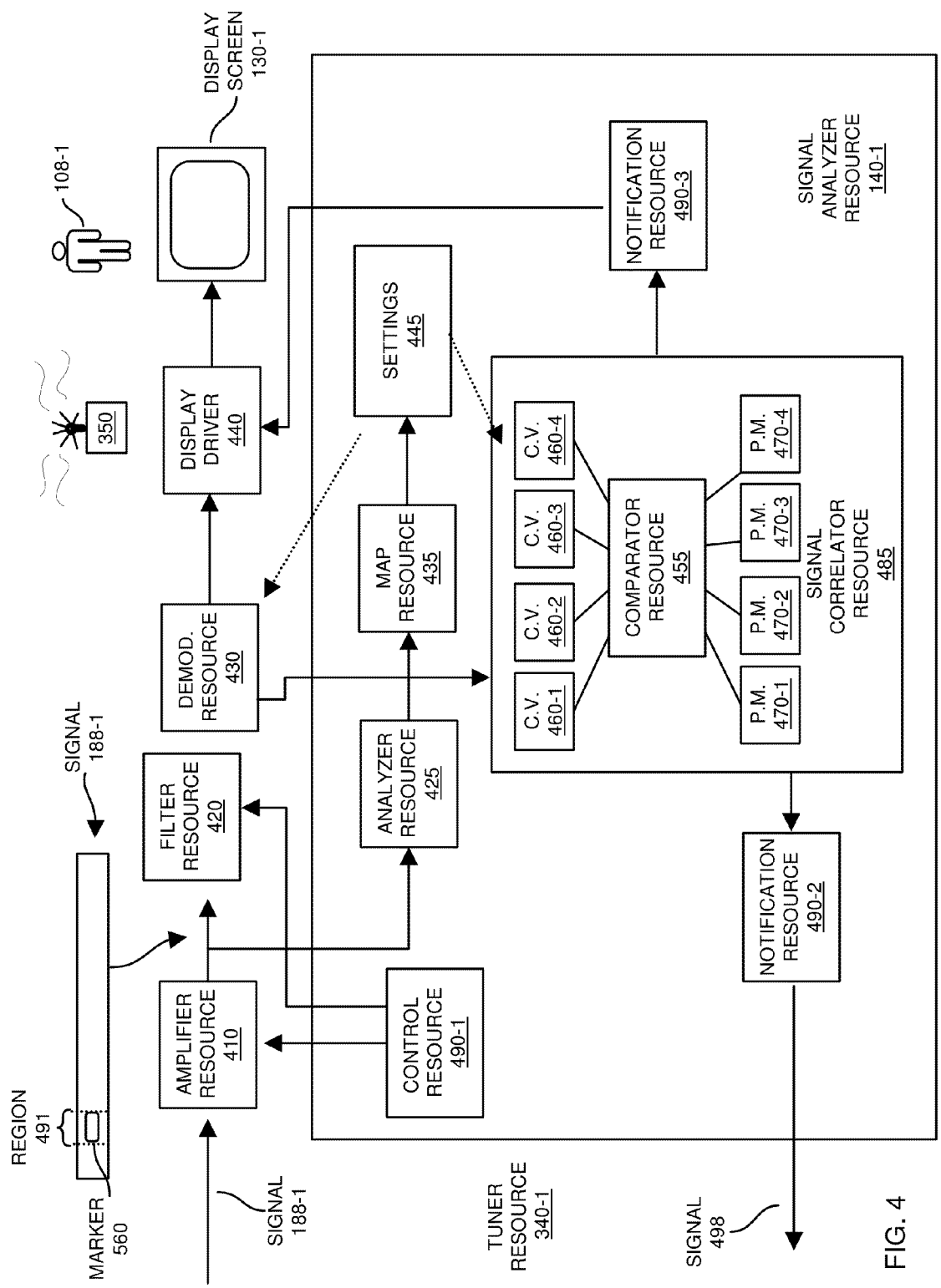
FIG. 4 is an example diagram illustrating a signal analyzer resource to perform operations such as detect and/or mitigate wireless interference according to embodiments herein.

FIG. 4 is an example diagram illustrating a signal analyzer resource according to embodiments herein.

As shown, tuner resource 340-1 includes filter resource 420 (tuner), demodulator resource 430, and display driver 440.

Assume in this example that a user 108-1 selects channel #5 for viewing corresponding content. In response to the selection, the tuner resource 340-1 tunes to a frequency band including the signal 188-1 (assume that signal 188-1 is transmitted in the selected channel #5) in the downstream channel of the physical communication link 170. As mentioned, the respective subscriber may be one of multiple subscribers in a cable network environment that tunes to the signal on the shared physical communication link 170.

The signal analyzer resource 140-1 and demodulation resource 430 monitor a corresponding frequency band in which signal 188-1 is transmitted. As previously discussed, at least a portion of the monitored frequency band in the physical communication link 170 is also allocated for transmissions of over-the-air wireless communications 186 in a vicinity of the physical communication link 170. For example, wireless signal generators 105 and/or mobile device 350 can be used in a vicinity of a respective subscriber domain 160-1. The wireless communications 186 produced by such as resources can interfere with one or more signals conveyed to subscriber domain 160-1 over communication link 170.

In this example embodiment, filter resource 420 receives signal 188-1 transmitted on physical communication link 170-1. Filter resource 420 passes the appropriate frequency band in which the signal 188-1 (and/or possible other signals of interest reside) to demodulation resource 430. As its name suggests, demodulation resource 430 demodulates the signal 188-1. Subsequent to demodulating the signal 188-1, display driver 440 performs any additional processing such as decoding that is needed to initiate playback of a rendition of the signal 188-1 on display screen 130-1.

Note that any or all bands of received signals on physical communication link 170 can be monitored in a similar manner as signal 188-1 is monitored.

As previously discussed, the tuner resource 340-1 can include signal analyzer resource 140-1. Signal analyzer resource 140-1 includes appropriate hardware and/or software to monitor a health of the received signal 188-1 and potentially mitigate the affects of wireless interference present in signal 188-1. Wireless interference can occur at any point between the transmitter resource 191, physical communication link 170, and tuner resource 340-1.

One embodiment herein includes dynamically adjusting settings of the signal analyzer resource 140-1 and/or demodulation resource 430 depending on attributes of the signal being received and processed. For example, signal analyzer resource 140-1 and demodulation resource 430 can be configured in accordance with first settings to monitor and mitigate affects of wireless interference for a first type of received modulated/encoded signal (e.g., signal standard DVB-C, 256 QAM); signal analyzer resource 140-1 and demodulation resource 430 can be configured in accordance with second settings to monitor and mitigate affects of wireless interference for a second type of received modulated/encoded signal (e.g., signal standard DOCSIS, 256 QAM); signal analyzer resource 140-1 and demodulation resource 430 can be configured in accordance with third settings to monitor and mitigate affects of wireless interference for a third type of received modulated/encoded signal (e.g., signal standard DOCSIS, 64 QAM); and so on. The type of received signal can vary.

The signal analyzer resource 140-1 can be configured to receive notification of the type of signal being processed via any suitable manner.

For example, in one non-limiting example embodiment, the analyzer resource 425 in signal analyzer resource 140-1 is configured to monitor the received signal 188-1 to detect a type of modulation used by transmitted resource 191 to modulate respective data 120 onto the signal 188-1. Based on the monitoring of signal 188-1, the analyzer resource 425 receives or retrieves a unique identifier value (such as symbol, marker, binary information, packet of data, etc.) located in a portion of signal 188-1 such as from a header. The unique identifier value can indicate one or more attributes such as the type of modulation/encoding used by the transmitter resource 191 to produce received signal 188-1. Recall that signal 188-1 can include some amount of interference.

In one embodiment, the analyzer resource 425 obtains and analyzes the unique identifier value in a region 491 such as a header of received signal 188-1 to identify a corresponding set of configuration values that are to be used to configure signal correlator resource 485 and/or demodulation resource 430. Assume in this example embodiment that the analyzer resource 425 detects marker 560 (as further used by map resource 435 in FIG. 5 below) in the received signal 188-1 as the unique identifier value in region 491. As mentioned, the marker 560 indicates attributes associated with the signal 188-1 such as a specific type of modulation, encoding, etc., used to produce signal 188-1.

Figure 5:
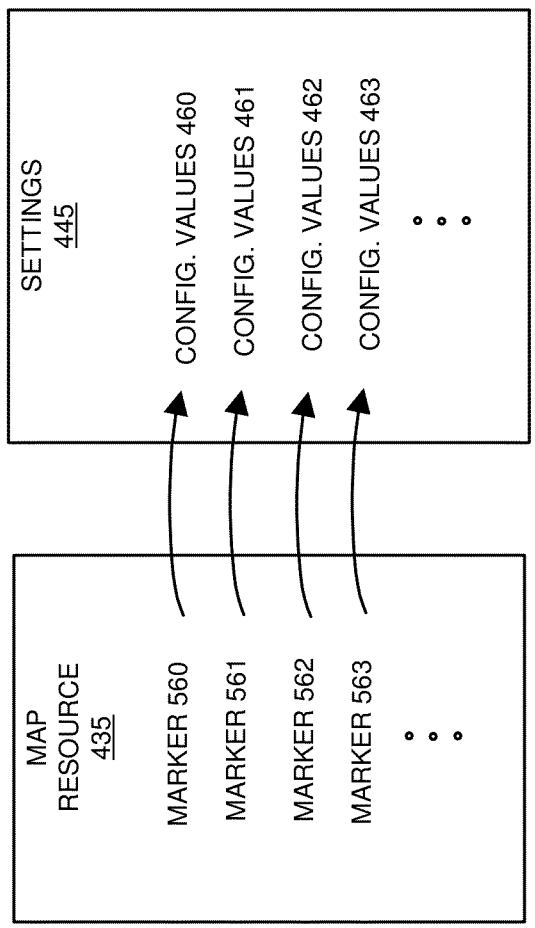
FIG. 5 is an example diagram illustrating mapping of different types of unique identifier values (markers) to configuration values according to embodiments herein.

FIG. 5 is an example diagram illustrating how to map a unique identifier value to corresponding configuration values according to embodiments herein.

As shown, map resource 435 includes different types of markers that may be found in a received signal transmitted over physical communication link 170. Marker 560 corresponds to a first type of encoding attributes; marker 561 corresponds to a second type of attributes; marker 562 corresponds to a third type of attributes; marker 563 corresponds to a fourth type of attributes; and so on.

For each of the different types of attributes that can be associated with a respective received signal, map resource 435 includes a pointer to a corresponding set of configuration values in settings 445 that are to be used by signal correlator resource 485 and demodulation resource 430 in FIG. 4 to analyze the respective received signal. In one embodiment, the settings 445 can be any suitable type of information such as threshold values to monitor performance metrics associated with the received signal 188-1. Additional portions of respective configuration information for a respective type can indicate how to configure the demodulation resource 430 with respective correlator settings so that the signal can be demodulated and subsequently decoded.

In this example embodiment, marker 560 in map resource 435 maps to set of configuration values 460; marker 561 in map resource 435 maps to set of configuration values 461; marker 562 in map resource 562 maps to set of configuration values 462; marker 563 in map resource 435 maps to set of configuration values 463; and so on.

As previously mentioned, assume in this example that analyzer resource 425 detects that the received signal 188-1 includes a unique identifier value such as marker 560 in a header of received signal 188-1. Using map resource 435, signal analyzer resource 140-1 maps the marker 560 to set of configuration values 460. Thus, in response to detecting that received signal 188-1 includes the marker 560, the signal analyzer resource 140-1 retrieves and uses the set of configuration values 460 to configure the signal correlator resource 485 and configure demodulation resource 430 to process received signal 188-1.

As mentioned, different configuration values can be selected for configuring the signal analyzer resource 140-1 and the demodulation resource 430 depending on the type of marker in the received signal. Accordingly, the signal analyzer resource 140-1 dynamically adjusts itself depending on the type of received signal to be decoded or demodulated.

In this example embodiment, selected configuration values 460 includes configuration value 460-1, configuration value 460-2, configuration value 460-3, configuration value 460-4, and so on. Signal analyzer resource 140-1 uses set of configuration values 460 including configuration value 460-1, configuration value 460-2, configuration value 460-3, configuration value 460-4, etc., to configure signal correlator resource 485 as shown in FIG. 4. As mentioned, another portion of configuration values 460 can be used to configure a correlator in demodulation resource 430 to process the receive signal 188-1.

In one non-limiting example embodiment, each of configuration values configuration value 460-1, configuration value 460-2, configuration value 460-3, etc., can represent a different performance parameter to be monitored. For example, configuration value 460-1 can represent a threshold value for a first monitored parameter such as a block error rate (BLER) associated with signal 188-1; configuration value 460-2 can represent a threshold value for a second monitored parameter such as a modulation error ratio (MER) associated with signal 188-1; configuration value 460-3 can represent a threshold value for a third monitored parameter such as a signal to noise plus interference ratio (SNIR) associated with signal 188-1; configuration value 460-4 can represent a threshold value for a fourth monitored parameter such as a error vector magnitude (EVM) associated with signal 188-1; and so on.

In one embodiment, EVM is a measure used to quantify an ability of the tuner resource 340-1 to receive signal 188-1. EVM can be defined as a difference between the measured waveform and the theoretical modulated waveform. It is a measure of the difference between the ideal symbols and the measured symbols. The difference is called the error vector. The value can be expressed in decibels or percent.

By way of a non-limiting example, the MER is a measure of the sum of all interference that can affect a television signal. It is typically expressed as decibels as a logarithmic relationship between the RMS (Root Mean Square) value and the ideal transmitted signal and the RMS power of the error vector. A high MER indicates a good signal quality.

To determine whether the received signal 188-1 has been corrupted by presence of wireless interference, the signal correlator resource 485 and/or demodulation resource 430 process the received signal 188-1 to produce performance metrics such as performance metric 470-1, performance metric 470-2, performance metric 470-3, performance metric 470-4, and so on.

More specifically, by way of a non-limiting example, the signal correlator resource 485 produces performance metric 470-1 representing a first monitored parameter such as a block error rate (BLER) associated with received signal 188-1; the signal correlator resource 485 produces performance metric 470-2 representing a second monitored parameter such as a modulation error ratio (MER) associated with received signal 188-1; the signal correlator resource 485 produces performance metric 470-3 representing a third monitored parameter such as signal to noise plus interference ratio (SNIR) associated with received signal 188-1; the signal correlator resource 485 produces performance metric 470-2 representing a fourth monitored parameter such as an error vector magnitude (EVM) associated with received signal 188-1; and so on. As shown, the performance metrics can be generated based at least in part input form demodulation resource 430 that participates in processing of received signal 188-1.

The signal correlator resource 485 utilizes the corresponding set of configuration values 460 as a basis to monitor a presence of wireless interference on the monitored channel including signal 188-1. For example, a portion of the corresponding set of configuration values 460 can represent one or more threshold values. As mentioned, the signal correlator resource 485 produces multiple health or performance metrics such as performance metrics 470 (e.g., performance metric 470-1, performance metric 470-2, performance metric 470-3, performance metric 470-4, and so on). The signal correlator resource 485 can constantly update the performance metrics 470 over time as the signal 188-1 is received and/or consumed.

The comparator resource 455 constantly compares the health or performance metrics 470 to the set of configuration values 460 (such as threshold values) to determine a presence of wireless interference on the signal 188-1. For example, comparator resource 455 can be configured to compare the constantly updated signal performance metric 470-1 to configuration value 460-1. If the comparison indicates that the performance metric 470-1 associated with signal 188-1 is above the threshold value as specified by configuration value 460-1, the signal correlator resource 485 records the event.

In a similar manner, comparator resource 455 can be configured to compare the constantly updated signal performance metric 470-2 to configuration value 460-2. If the comparison indicates that the performance metric 470-2 is below the threshold value as specified by configuration value 460-2, the signal correlator resource 485 records the event.

In a similar manner, comparator resource 455 can be configured to compare the constantly updated signal performance metric 470-3 to configuration value 460-3. If the comparison indicates that the performance metric 470-3 is below the threshold value as specified by configuration value 460-3, the signal correlator resource 485 records the event.

In a similar manner, comparator resource 455 can be configured to compare the constantly updated signal performance metric 470-4 to configuration value 460-4. If the comparison indicates that the performance metric 470-4 is above the threshold value as specified by configuration value 460-4, the signal correlator resource 485 records the event.

Signal correlator resource 485 can be configured to use the performance status information (such as recording of different events) as a basis to determine health of the received signal and potentially generate notifications. For example, depending on rules indicating what constitutes detection of wireless interference, in the event that one or more recorded events indicate the presence of wireless interference on signal 188-1 above a threshold value, the signal correlator resource 485 can be configured to perform different functions.

More specifically, in one example embodiment, in response to detecting wireless interference on the signal 188-1 (selected channel) based on comparison of the performance metrics 470 to the set of configuration values 460, the signal correlator resource 485 can be configured to notify controller resource 490-1 to adjust settings of a pre-amplifier resource in demodulation resource 430 that is used to pre-amplify a portion of the signal 188-1 in demodulator resource. This pre-amplifier adjustment of signal 188-1 (or certain components) can mitigate the affects of wireless interference coupling onto signal 188-1. In other words, adjusting settings of pre-amplifier resource can render it possible to properly demodulate and decode the signal 188-1 for playback of a rendition of the respective signal on the display screen 130-1.

Note that in one example embodiment, the demodulation resource separates (as best possible) the interference portion of received signal 188-1 and the original portion of signal 188-1. The pre-amplifier in demodulation resource 430 can be configured to amplify the original portion or component of the signal 188-1 (and not or minimally amplify the interference component) so that it is possible to demodulate and produce a rendition of the signal 188-1 on display screen 130-1.

In accordance with further embodiments, the signal correlator resource 485 can be configured to notify additional resources of the presence of wireless interference when so detected. For example, in response to detecting the presence wireless interference on the monitored channel including signal 188-1, the signal correlator resource 485 can notify controller resource 490-1 of the detected condition (such as the channel or corresponding block of channels that fails as a result of wireless interference).

The controller resource 490-1 can be configured to control a filter disposed in demodulation resource 430 to block the signal 188-1 (and potentially the block of channels or specific channel where the interference is detected) and/or prevent attempted playback of the signal on the display screen 130-1. In other words, in response to receiving notification that the received signal 188-1 is corrupted above a threshold value, the control resource 490-1 can prevent playback of a rendition of the signal 188-1 on the display screen 130-1.

Accordingly, embodiments herein can include preventing playback of the signal 188-1 on a display screen 130-1 in response to detecting wireless interference on the monitored channel.

To keep the user 108-1 informed of the occurrence of wireless interference and that the signal has been blocked, the signal correlator resource 485 notifies notification resource 490-3 of the condition. In response to receiving the notification of failure (such as that signal 188-1 includes wireless interference is above a threshold value, signal 188-1 has been blocked, etc.) from signal correlator resource 485, the notification resource 490-3 communicates a message to display driver 440. Display driver 440 provides notification of the wireless interference on the display screen 130-1 to user 108-1 (such as a subscriber) that attempts to view playback of the signal on the display screen 130-1. The notification displayed on display screen 130-1 can be a message such as "Wireless interference was detected on the channel selected for playback. Please tune to alternative channel ABC to view the corresponding content."

Additional embodiments herein can include initiating display of a message on display screen 130-1 such as "Please turn off your mobile handset" on display screen 130-1 to notify the user that the wireless interference is likely caused by device 350 operated by the user 108-1 in subscriber domain 160-1.

After a source of the wireless interference has been terminated, the signal analyzer resource detects such a condition and initiates playback of a rendition of the signal 188-1 on display screen 130-1.

Further embodiments herein can include providing notification to one or more upstream resources over physical communication link 170 that wireless interference has been detected at the tuner resource 340-1. For example, in response to detecting presence of the wireless interference on the channel (signal 188-1) above a threshold value, the signal correlator resource 485 can be configured to provide interference notification of the condition to notification resource 490-2. In response to receiving interference notification from signal correlator resource 485, notification resource 490-2 transmits signal 498 such as an interference notification, feedback message, etc., over physical communication link 170 to an upstream resource (such as transmitter resource 191 and/or management resource 185) in the shared cable network. The notification (such as signal 498) can be transmitted over a pre-specified upstream channel, such as a management channel, dedicated to supporting communications between one or more subscriber domains and the management resource 185.

In one embodiment, the notification is sent to a technician or customer support personnel that attempt to correct the interference.

In one embodiment, in response to the detection of wireless interference, the management resource 185 allocates an auxiliary block of channels (i.e., a block of channel other than the original block of channels including signal 188-1) on which to retransmit information in the failing block. In certain instances, it may be desirable that the transmitter resource 191 discontinues transmitting (downstream) data (such as multiple channels of content) on the block experiencing the wireless interference.

In accordance with further embodiments, the management resource 185 can be configured to communicate with the tuner resource 340-1 to indicate an auxiliary block of channels on which to receive the broadcasted content. The tuner resource 340-1 receives the allocation message from the upstream resource (such as management resource 185) indicating an alternative (auxiliary) block on which to receive a rendition of signal 188-1. The tuner resource 340-1 tunes to the auxiliary block and appropriate substitute channel in the block to receive the retransmitted rendition of the original signal. Processing circuitry tuned to the new channel initiates playback of the signal received on the auxiliary channel (instead of the original channel experiencing the interference) on display screen 130-1.

Accordingly, one way of mitigating the affects caused by wireless interference on signal 188-1 is to notify an upstream resource that allocates a new channel on which to receive the originally selected content.

Note that as an alternative to measuring and producing multiple performance metrics, embodiments herein can include monitoring a single parameter. For example, the signal analyzer resource 140-1 can be configured to obtain a performance threshold value indicating an acceptable level of error associated with a respective performance parameter. The signal analyzer resource 140-1 generates status information (such as performance information) for the respective performance parameter based on processing of the received signal. As mentioned, the signal analyzer resource 140-1 compares the status information to the performance threshold value to detect the occurrence of wireless interference coupling onto the received signal 188-1.

In accordance with yet further embodiments, the notification from signal analyzer resource 140-1 can indicate to the management resource 185 to discontinue transmitting on a respective frequency band. For example, in response to detecting wireless interference, the signal analyzer resource 140-1 can notify the management resource 185 of the frequency band experiencing interference. In response to receiving the interference message, the management resource 185 can be configured to discontinue communications on the failing frequency band affected by the wireless interference.

Referring again to FIG. 1, and as previously discussed, the management resource 185 can be configured to control a transmitter resource 191 to transmit a respective signal 155-S on a primary channel downstream over a shared physical communication link 170 to multiple target resources such as multiple subscriber domains 160. The management resource 185 can receive notification or feedback from a given target resource (such as subscriber domain 160-1) that the signal 188-1 received by the given target resource on a primary channel is corrupted (such as due to wireless interference coupling onto signal 155-S).

In one embodiment, the feedback or notification from the target recipient specifies a frequency band of the primary channel on which the given target resource is unable to process (such as demodulate, decode, etc.) properly due to interference. That is, as mentioned, corruption of the original signal 155-S transmitted over the primary channel can be caused by wireless interference signal 155-I coupling onto the original signal 155-S transmitted over shared physical communication link 170.

When the original signal 155-S is corrupted, the subscriber domain 160-1 may not be able to process and properly play back a rendition of signal 188-1.

To accommodate playback of a rendition of the signal, the management resource 185 can be configured to allocate a secondary channel on which to transmit the signal 155 downstream to the given target resource. Subsequent to allocation, the tuner resource 191 transmits the signal 155 over the shared physical communication link 170 on the secondary channel.

The management resource 185 can be configured to notify the downstream subscriber domain that the signal 155 (and corresponding content) is available on the newly allocated secondary channel. For example, the management resource 185 can be configured to generate a message to the subscriber domain 160-1. The message can indicate that the signal 155 is available to the given target recipient on the secondary channel. The management resource initiates transmission of the message over a management channel of the shared physical communication link to the subscriber domain 160-1. The management channel can be configured to convey out-of-band communications between any of one or more subscriber domains 160 and the management resource 185.

Figure 6:
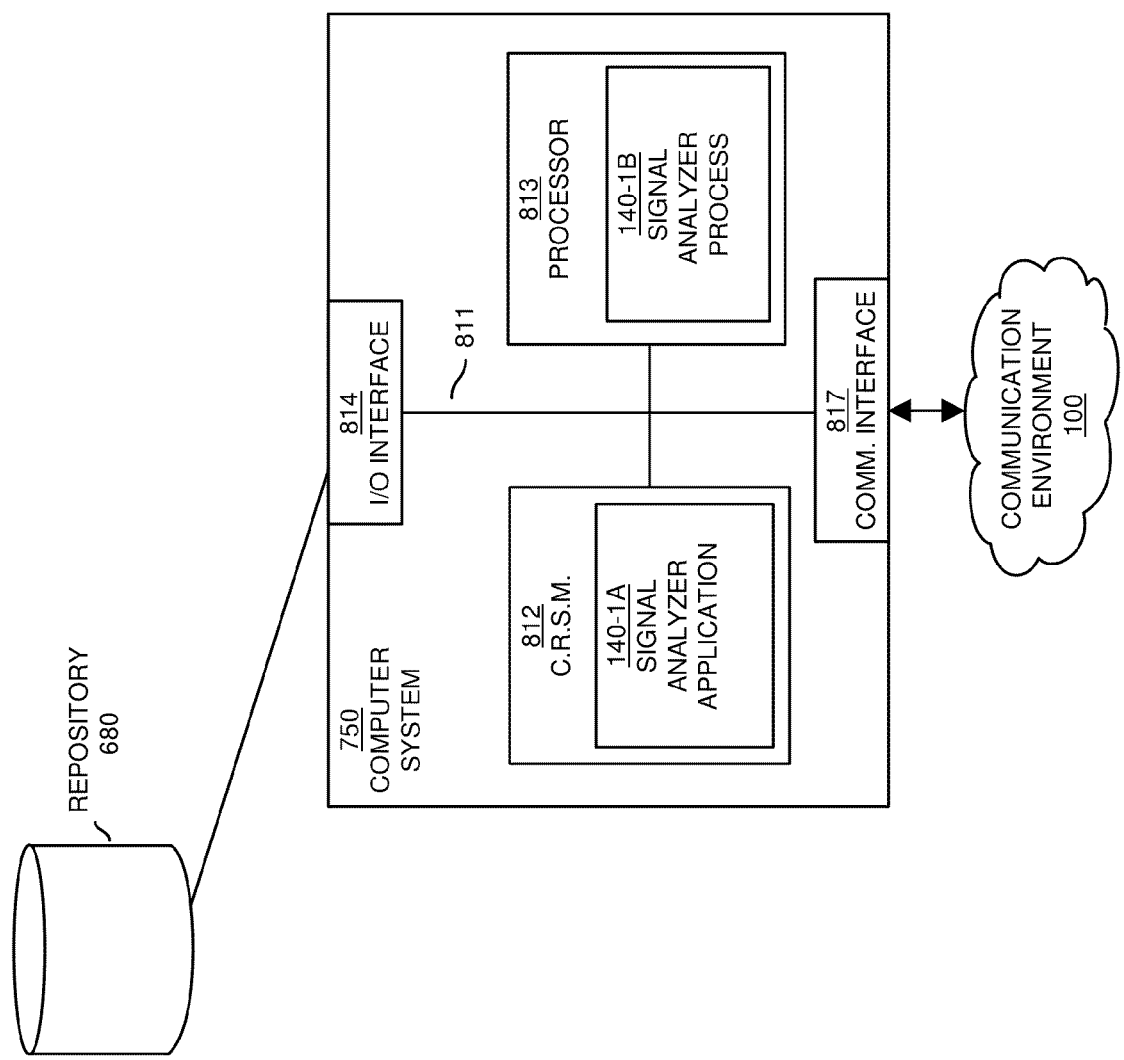
FIG. 6 is a diagram illustrating an example computer architecture in which to execute any of the functionality according to embodiments herein.

FIG. 6 is an example block diagram of a computer device for implementing any of the operations as discussed herein.

As shown, computer system 750 such as a computer apparatus, computer device, etc., of the present example can include an interconnect 811 that couples computer readable storage media 812 such as a non-transitory type of media (i.e., any type of hardware storage medium, tangible storage medium, etc.) in which digital information can be stored and retrieved, a processor 813 (e.g., one or more processor devices or hardware processors, processing hardware, computer processor hardware, etc.), I/O interface 814, and a communications interface 817. Communications interface 817 enables the computer system 750 to communicate with other network elements present in a corresponding network environment.

I/O interface 814 provides connectivity to a repository 680 and, if present, other devices such as a playback device, display screen, keypad, a computer mouse, etc.

Computer readable storage medium 812 can be any hardware storage resource or device such as memory, optical storage, hard drive, floppy disk, etc. In one embodiment, the computer readable storage medium 812 stores instructions and/or data.

Communications interface 817 enables the computer system 750 and processor 813 to communicate with network elements in communication environment 100 retrieve information from remote sources such as network elements and communicate with other computers. I/O interface 814 enables processor 813 (i.e., computer processor hardware) to retrieve stored information from repository 680.

As shown, computer readable storage media 812 is encoded with signal analyzer application 140-1A (e.g., software, firmware, computer code, etc.) executed by processor 813. In one embodiment, the signal analyzer resource 140-1 executes the signal analyzer application 140-1A. Signal analyzer application 140-1A can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in signal analyzer application 140-1 stored on computer readable storage medium 812.

Execution of the signal analyzer application 140-1A (running on signal analyzer resource 140-1) produces processing functionality such as signal analyzer process 140-1B (running on signal analyzer resource 140-1) in processor 813. In other words, the signal analyzer process 140-1B associated with processor 813 represents one or more aspects of executing signal analyzer application 140-1A within or upon the processor 813 in the computer system 750.

Those skilled in the art will understand that the computer system 750 can include other processes and/or software and hardware components, such as an operating system that controls allocation and use of hardware resources to execute signal analyzer application 140-1A (running on signal analyzer resource 140-1).

In accordance with different embodiments, note that computer system 750 may be any of various types of devices, including, but not limited to, a mobile computer, a personal computer system, a server resource, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 750 may reside at any location or can be included in any suitable resource in communication environment 100 to implement functionality as discussed herein.

Functionality supported by the different resources will now be discussed via flowcharts in FIGS. 7-9. Note that the steps in the flowcharts below can be executed in any suitable order.

Figure 7:
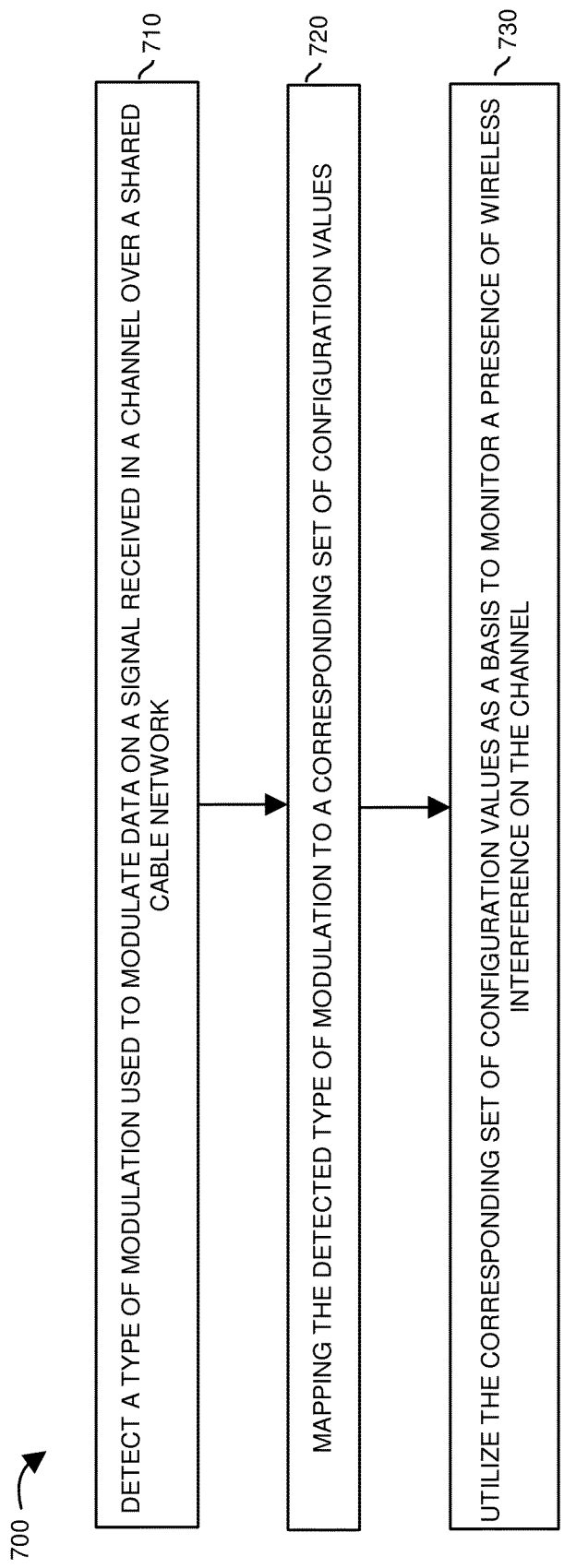
FIGS. 7-9 are diagrams of example methods according to embodiments herein.

FIG. 7 is a flowchart 700 illustrating an example method according to embodiments. Note that there will be some overlap with respect to concepts as discussed above.

In processing block 710, the signal analyzer resource 140-1 detects a type of modulation used to modulate data on a signal 188-1 received in a channel over a shared cable network.

In processing block 720, the signal analyzer resource 140-1 maps the detected type of modulation to a corresponding set of configuration values.

In processing block 730, the signal analyzer resource 140-1 utilizes the corresponding set of configuration values as a basis to monitor a presence of wireless interference on the channel.

Figure 8:
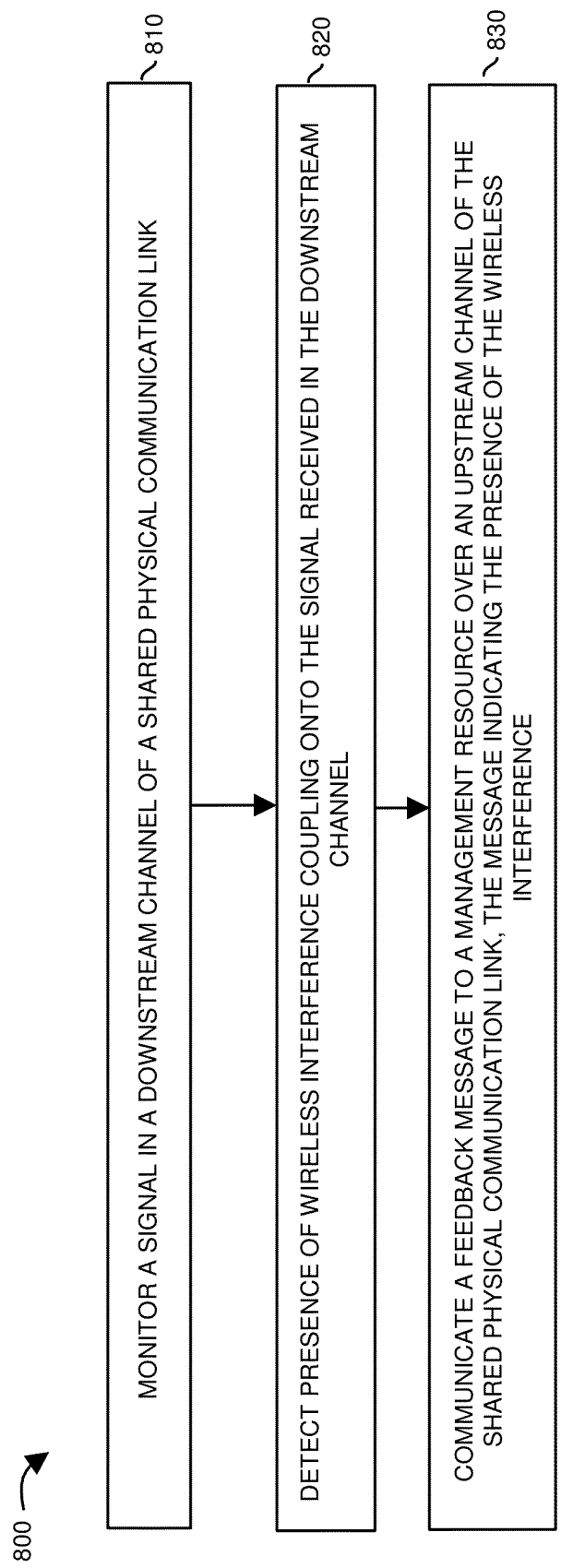

FIG. 8 is a flowchart 800 illustrating an example method according to embodiments. Note that there will be some overlap with respect to concepts as discussed above.

In processing block 810, the signal analyzer resource 140-1 monitors a signal in a downstream channel of a shared physical communication link 170.

In processing block 820, the signal analyzer resource 140-1 detects presence of wireless interference coupling onto the signal 188-1 received in the downstream channel.

In processing block 830, the signal analyzer resource 140-1 communicates a feedback message to a management resource 185 over an upstream channel of the shared physical communication link 170. The message indicates the presence of the wireless interference.

Figure 9:
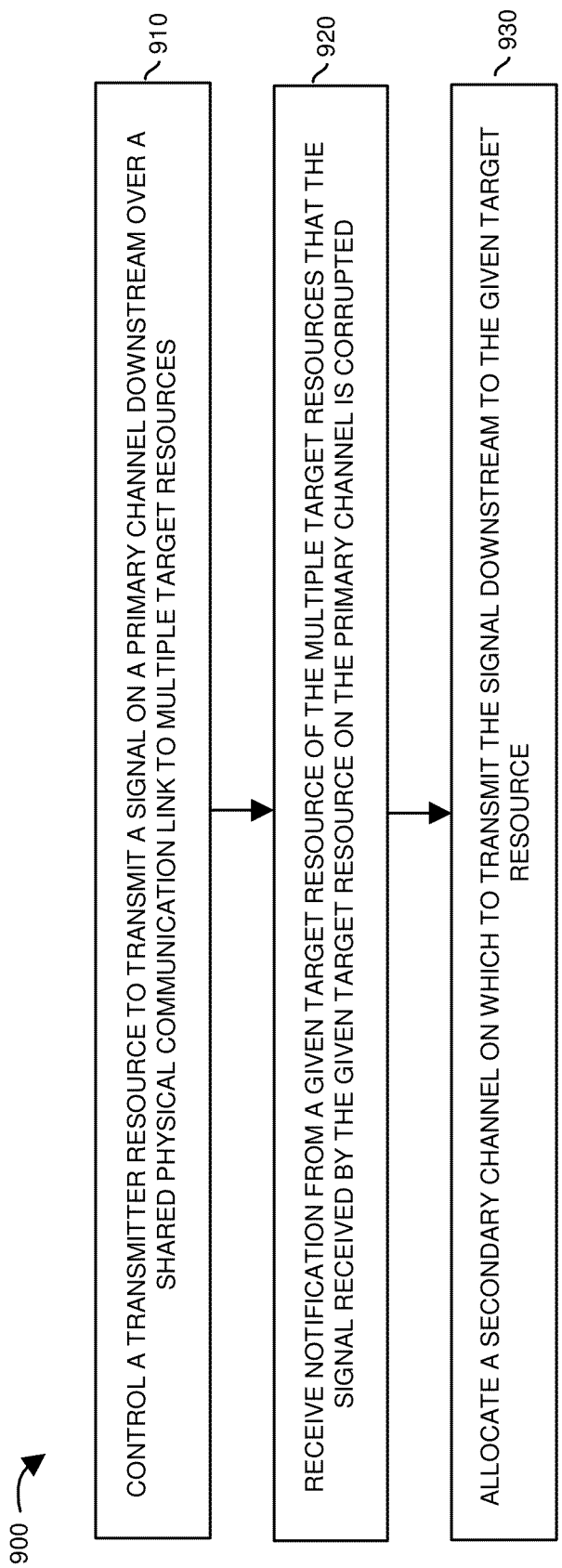

FIG. 9 is a flowchart 900 illustrating an example method according to embodiments. Note that there will be some overlap with respect to concepts as discussed above.

In processing block 910, the management resource 185 controls a transmitter resource 191 to transmit a signal 188-1 on a primary channel downstream over a shared physical communication link 170 to multiple target resources such as subscriber domains 160.

In processing block 920, the management resource 185 receives notification from a given target resource (such as signal analyzer resource 140-1 in subscriber domain 160-1) of the multiple target resources that the signal 188-1 received by the given target resource on the primary channel is corrupted.

In processing block 930, the management resource 185 allocates a secondary channel on which to transmit a rendition of the signal 188-1 downstream to the given target resource. Accordingly, even though there is interference on the primary channel, the subscriber domain can receive the signal on the secondary channel and playback a corresponding rendition of such content.

Note again that techniques herein are well suited for detecting and/or mitigating affects of wireless coupling onto signals transmitted over a physical communication link. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   via processing hardware:
   detecting a type of modulation used to modulate data onto a signal received in a channel over a physical link of a shared cable network;
   mapping the detected type of modulation to a corresponding set of configuration values; and
   utilizing the corresponding set of configuration values as a basis to detect a presence of wireless interference on the channel of the physical link, the wireless interference coupling onto the physical link and degrading the signal based on transmission of over-the-air wireless communications in a vicinity of the physical link.

2. The method as in claim 1, wherein detecting the type of modulation includes:
   receiving a unique identifier value on the signal, the unique identifier value indicating the type of modulation used to encode the data on the signal; and
   analyzing the unique identifier value received in the signal to identify the corresponding set of configuration values, the corresponding set of configuration values being one of multiple sets of configuration values, each set of the multiple sets corresponding to a different type of modulation.

3. The method as in claim 2, wherein the corresponding set of configuration values includes a set of threshold values; and
   wherein utilizing the corresponding set of configuration values includes:
   producing multiple performance metrics associated with the signal; and
   comparing the performance metrics to the set of threshold values.

4. The method as in claim 3 further comprising:
   in response to detecting wireless interference on the channel based on comparison of the performance metrics to the set of threshold values, adjusting settings of an amplifier used to amplify the signal received on the channel.

5. The method as in claim 4 further comprising:
   providing notification of the wireless interference detected on the channel.

6. The method as in claim 1 further comprising:
   detecting presence of the wireless interference above a threshold value based on the corresponding set of configuration values; and
   providing notification of the wireless interference on a display screen to a subscriber that attempts to view playback of a rendition of the signal on the display screen.

7. The method as in claim 1 further comprising:
   in response to detecting the wireless interference on the channel, controlling a filter to block the signal to prevent attempted playback of a rendition of the signal on a display screen.

8. The method as in claim 1 further comprising:
   in response to detecting presence of the wireless interference on the channel above a threshold value, transmitting an interference notification to an upstream resource in the shared cable network that manages transmission of the signal downstream to the processing hardware, the interference notification indicating that the detected wireless interference present on the channel of the physical link is above a threshold value, the threshold value defined by the corresponding set of configuration values.

9. The method as in claim 8 further comprising:
receiving a message from the upstream resource indicating an alternative channel on which to receive the signal; and tuning to the alternative channel to receive the signal.

10. The method as in claim 1, wherein the over-the-air wireless communications are transmitted in a same frequency band that the signal is transmitted over the physical communication link.

11. The method as in claim 10, wherein the over-the-air wireless communications are transmitted from a first wireless communication resource over-the-air to a second wireless communication resource.

12. The method as in claim 11 further comprising:
detecting presence of the wireless interference above a threshold value, the threshold value defined by a particular configuration value in the corresponding set of configuration values;
providing notification of the wireless interference;
receiving notification that a rendition of the signal is being transmitted over a newly assigned frequency band that is different than the same frequency band; and
receiving a rendition of the signal over the newly assigned frequency band.

13. The method as in claim 1 further comprising:
in response to detecting the wireless interference using the corresponding set of configuration values obtained from the mapping, initiating adjustment of a preamplifier resource that amplifies the received signal, adjustment of the preamplifier resource facilitating demodulation and decoding of the signal received over the channel of the physical link.

14. A method comprising:
via signal processing hardware:
monitoring a signal in a downstream channel of a shared physical communication link;
detecting presence of wireless interference coupling onto the signal received in the downstream channel; and
communicating a feedback message to a management resource over an upstream channel of the shared physical communication link, the message indicating the presence of the wireless interference;
wherein monitoring the signal includes: monitoring a frequency band of the shared physical communication link, at least a portion of the monitored frequency band in the shared physical communication link also allocated for transmission of wireless communications over a wireless medium external to the shared physical communication link; and in response to detecting corruption of the signal in the monitored frequency band over the shared physical communication link based on transmission of the wireless communications over the wireless medium external to the shared physical communication link, transmitting the feedback message from the signal processing hardware to the management resource.

15. The method as in claim 14 further comprising:
tuning to the signal in the downstream channel of the shared physical communication link in response to receiving a command from a respective subscriber, the respective subscriber being one of multiple subscribers that tune to the signal on the shared physical communication link.

16. The method as in claim 14 further comprising:
adjusting amplification of the signal to overcome the presence of the wireless interference.

17. A method comprising:
via signal processing hardware:
monitoring a signal in a downstream channel of a shared physical communication link;
detecting presence of wireless interference coupling onto the signal received in the downstream channel; and
communicating a feedback message to a management resource over an upstream channel of the shared physical communication link, the message indicating the presence of the wireless interference;
wherein monitoring the signal in the downstream channel of the shared physical communication link includes:
obtaining a unique identifier value from the signal received in the downstream channel;
mapping the unique identifier value to a performance threshold value, the performance threshold value indicating a level of error associated with a respective performance parameter;
generating a performance metric for the respective performance parameter based on processing of the signal; and
comparing the performance metric to the performance threshold value to detect the occurrence of wireless interference coupling onto the signal.

18. A method comprising:
controlling a transmitter resource to transmit a signal on a primary channel downstream over a shared physical communication link to multiple target resources;
receiving notification from a given target resource of the multiple target resources that the signal received by the given target resource on the primary channel is corrupted; and
in response to receiving the notification, allocating a secondary channel on which to transmit the signal downstream to the given target resource.

19. The method as in claim 18 further comprising:
transmitting the signal over the shared physical communication link on the secondary channel;
generating a message to the given target resource, the message indicating that the signal is available to the given target recipient on the secondary channel; and
transmitting the message over a management channel of the shared physical communication link to the given target resource, the management channel configured to convey out-of-band communications between the given target resource and the management resource.

20. The method as in claim 19, wherein receiving the notification includes:
at the management resource:
receiving feedback from the given target recipient, the feedback specifying a frequency band of the primary channel on which the given target resource is unable to demodulate the signal received on the primary channel.

21. The method as in claim 20, wherein corruption of the signal over the primary channel is caused by wireless interference coupling onto the shared physical communication link.

22. A computer system comprising:
computer processor hardware; and
a hardware storage resource coupled to the computer processor hardware, the hardware storage resource storing instructions that, when executed by the computer processor hardware, causes the computer processor hardware to perform operations of:

detecting a type of modulation used to modulate data onto a signal received in a channel of a physical link over a shared cable network;
mapping the detected type of modulation to a corresponding set of configuration values; and
utilizing the corresponding set of configuration values as a basis to detect a presence of wireless interference on the channel, the wireless interference coupling onto the physical link and degrading the signal based on wireless communications transmitted on a medium external to the physical link.

23. The computer system as in claim 22, wherein detecting the type of modulation includes:
receiving a unique identifier value on the signal, the unique identifier value indicating the type of modulation used to encode the data on the signal; and
analyzing the unique identifier value received in the signal to identify the corresponding set of configuration values, the corresponding set of configuration values being one of multiple sets of configuration values, each set of the multiple sets corresponding to a different type of modulation.

24. The computer system as in claim 23, wherein the corresponding set of configuration values includes a set of threshold values; and
wherein utilizing the corresponding set of configuration values includes:
producing multiple performance metrics associated with the signal; and
comparing the performance metrics to the set of threshold values.

25. The computer system as in claim 24, wherein the computer processor hardware further performs operations of:
in response to detecting wireless interference on the channel based on comparison of the performance metrics to the set of threshold values, adjusting settings of an amplifier used to amplify the signal received on the channel.

26. The computer system as in claim 25, wherein the computer processor hardware further performs operations of:
providing notification of the wireless interference detected on the channel.

27. The computer system as in claim 22, wherein the computer processor hardware further performs operations of:
detecting presence of the wireless interference above a threshold value based on the corresponding set of configuration values; and
providing notification of the wireless interference on a display screen to a subscriber that attempts to view playback of a rendition of the signal on the display screen.

28. The computer system as in claim 22, wherein the computer processor hardware further performs operations of:
in response to detecting the wireless interference on the channel, controlling a filter to block the signal to prevent attempted playback of a rendition of the signal on a display screen.

29. The computer system as in claim 22, wherein the computer processor hardware further performs operations of:
in response to detecting presence of the wireless interference on the channel above a threshold value, transmitting an interference notification to an upstream resource in the shared cable network that manages transmission of the signal downstream to the processing hardware, the interference notification indicating that the detected wireless interference is above a threshold value.

30. The computer system as in claim 29, wherein the computer processor hardware further performs operations of:

receiving a message from the upstream resource indicating an alternative channel on which to receive the signal; and
tuning to the alternative channel to receive the signal.

31. A computer system comprising:
computer processor hardware; and
a hardware storage resource coupled to the computer processor hardware, the hardware storage resource storing instructions that, when executed by the computer processor hardware, causes the computer processor hardware to perform operations of:
monitoring a signal in a downstream channel of a shared physical communication link;
detecting presence of wireless interference coupling onto the signal received in the downstream channel; and
communicating a feedback message to a management resource over an upstream channel of the shared physical communication link, the message indicating the presence of the wireless interference;
wherein monitoring the signal in the downstream channel of the shared physical communication link includes:
obtaining a unique identifier value from the signal received in the downstream channel;
mapping the unique identifier value to a performance threshold value, the performance threshold value indicating a level of error associated with a respective performance parameter;
generating a performance metric for the respective performance parameter based on processing of the signal; and
comparing the performance metric to the performance threshold value to detect the occurrence of wireless interference coupling onto the signal.

32. The computer system as in claim 31, wherein monitoring the signal includes:
monitoring a frequency band of the shared physical communication link, at least a portion of the monitored frequency band in the shared physical communication link also allocated for transmission of wireless communications; and
in response to detecting corruption of the signal in the monitored frequency band, transmitting the feedback message from the signal processing hardware to the management resource.

33. The computer system as in claim 31, wherein the computer processor hardware further performs operations of:
tuning to the signal in the downstream channel of the shared physical communication link in response to receiving a command from a respective subscriber, the respective subscriber being one of multiple subscribers that tune to the signal on the shared physical communication link.

34. The computer system as in claim 31, wherein the computer processor hardware further performs operations of:
adjusting amplification of the signal to overcome the presence of the wireless interference.

35. Computer-readable hardware storage having instructions stored thereon, the instructions, when carried out by computer processor hardware, causes the computer processor hardware to perform operations of:
monitoring a signal in a downstream channel of a shared physical communication link;
detecting presence of wireless interference coupling onto the signal received in the downstream channel; and
communicating a feedback message to a management resource over an upstream channel of the shared physical communication link, the message indicating the presence of the wireless interference;

wherein monitoring the signal includes: monitoring a frequency band of the shared physical communication link, at least a portion of the monitored frequency band in the shared physical communication link also allocated for transmission of wireless communications over a wireless medium external to the shared physical communication link; and in response to detecting corruption of the signal in the monitored frequency band over the shared physical communication link based on transmission of the wireless communications over the wireless medium external to the shared physical communication link, transmitting the feedback message from the signal processing hardware to the management resource.

* * * * *